United States Patent
Wu

(10) Patent No.: US 7,877,822 B2
(45) Date of Patent: Feb. 1, 2011

(54) NON-WATER LAVATORY FLUSHING DEVICE WITH FLUSHING PUMP

(76) Inventor: Hao Wu, 1303, Yuntong Garden Villa, Tongzhou District, Beijing (CN)

( * ) Notice: Subject to any disclaimer, the term of this patent is extended or adjusted under 35 U.S.C. 154(b) by 458 days.

(21) Appl. No.: 12/097,206

(22) PCT Filed: Dec. 14, 2005

(86) PCT No.: PCT/CN2005/002183
§ 371 (c)(1),
(2), (4) Date: Jun. 13, 2008

(87) PCT Pub. No.: WO2007/068144
PCT Pub. Date: Jun. 21, 2007

(65) Prior Publication Data
US 2010/0024116 A1    Feb. 4, 2010

(51) Int. Cl.
*E03D 9/10* (2006.01)
(52) U.S. Cl. .................. 4/319; 4/320; 4/321
(58) Field of Classification Search ............. 4/319–323, 4/363, 364
See application file for complete search history.

(56) References Cited
U.S. PATENT DOCUMENTS
4,115,876 A * 9/1978 Cole et al. ............... 4/319
4,246,665 A * 1/1981 Albertassi et al. ............... 4/320
5,891,330 A * 4/1999 Morris ........................... 4/320
6,412,121 B2 * 7/2002 Motoyama ....................... 4/319
2004/0143893 A1 * 7/2004 Wu et al. ........................ 4/319

* cited by examiner

Primary Examiner—Khoa D Huynh
(74) Attorney, Agent, or Firm—Banger Shia

(57) ABSTRACT

A non-water lavatory flushing device consists of a electrical four-way valve, which one of its exit is connected with the exit of the side wall of the valley at the back of the toilet pan for collecting the feces. The three exits are connected with the central part of the toilet pan, feces collecting box and the flushing liquid collecting box through a feces dispersing pipe, a feces collecting pipe and a urine collecting pipe. The non-water lavatory flushing device of the invention uses a four-way valve to replace the feces dispersing pipe magnetic valve, feces collecting pipe magnetic valve and urine collecting pipe of the prior art. The dispersed feces liquid and urine in the feces dispersing pipe, feces collecting pipe and urine collecting pipe is controlled by the four-way valve respectively. Then the structure is simplified and the cost is decreased. Furthermore, as the four-way joint is cancelled, the problem of wrong flowing of the leaving liquid is solved. Thus, it could be avoided that the feces plasm flow into flushing liquid collecting box or the limited clean urine is discharged along the feces collecting pipe and this is advantaged to improve the flushing effect.

1 Claim, 8 Drawing Sheets

NON-WATER LAVATORY FLUSHING DEVICE WITH FLUSHING PUMP

FIELD OF INVENTION

The invention relates to a lavatory flushing device having the special structure. The above structure has a flushing pump, so it is unnecessary to use the water as the flushing fluid.

BACKGROUND OF THE INVENTION

The applicant of the invention is as same as the international application (the publication number is WO02/68764), in which a kind of flushing lavatory is published. It consists of toilet pan, crushing pump and circuit control device. The stool crushing pipe is set at the bottom of the toilet pan and connected with the outlet of the crushing pump of the toilet pan. A magnetic valve is set on the stool crushing pipe. The stool collecting pipe is set at the bottom of the toilet pan and has a magnetic valve. The other end of the stool collecting pipe is open and can discharge the sewage. When flush the lavatory, under the control of the circuit control device, the flush liquid forms a circulation in the path generated by the toilet pan, crushing pump, stool crushing magnetic valve, stool crushing pipe and toilet pan and flushes the stool in the toilet pan into the crushing pump to crush. Then the stool liquid will mix with the flush liquid and become a gruel liquid; the circuit control device makes the magnetic value open and the crushing pump will rotate and make the sewage in the toilet pan discharged outside through the crushing pump, magnetic valve and stool collecting pipe. The water can be saved greatly by using the circulated flushing structure and the invention has the good effect of water saving. In addition, the urine collecting device, liquid medicine adding device, double-pump flushing device and automatic stool and urine identification device are set. The above structures combine together and configure the no headwater lavatory flushing system. It has the functions of sanitary flushing, no bad smell and controllable discharge and meets the requirement of environment protection.

But after having been used for some time it is found that the lavatory has some shortcomings. As the occupied space of the feces dispersing pipe, feces collecting pipe, urine collecting pipe and the magnetic valve of the above pipes and four-way connector is larger, thus the installation is complicated, the maintenance is difficult. Especially, as it is easy to leave the liquid in the four-way connector, so it makes the different magnetic value opens and leads to the connecting of different pipeline. Then the remaining liquid will flow to the place that it should not go. For example, the feces plasm flows into the flushing fluid collecting box, or the limited clean urine discharges through the feces collecting pipe.

SUMMARY OF THE INVENTION

The invention aims to solve the problems existing in the un-water flushing lavatory device with flushing pump. The problems include the larger occupied space of the feces dispersing pipe, feces collecting pipe, urine collecting pipe and the magnetic valve of the above pipes and four-way connector is larger, the complex of installation, inconvenience of maintenance, the leaving liquid in the four-way connector makes the different magnetic value opens and leads to the connecting of different pipeline and then the remaining liquid will flow to the place that it should not go. The invention provides a improved non-water flushing lavatory with flushing pump.

The non-water lavatory flushing device consists of a human detection device, a circuit control device, a toilet pan, a dispersing and centrifugal device, a upper flushing fluid flushing pump, a flushing liquid collecting box, a feces collecting box, an automatic deodorant liquid adding device. The dispersing and centrifugal device consists of a dispersing tool pan and a centrifugal blade wheel mounted on the same rotating shaft and a motor, which is mounted at the valley of the toilet pan, used for driving the rotating shaft. The upper flushing fluid flushing pump is mounted at the internal or external of the flushing liquid box and this makes the upper flushing liquid easy to be pumped out. The exit of the upper flushing fluid flushing pump is connected with the front of the toilet pan through a pipeline. It characterized in it also includes a electric control four-way value, which one of its exit is connected with the exit of the side wall of the valley at the back of the toilet pan for collecting the feces. The three exits are connected with the central part of the toilet pan, feces collecting box and the flushing liquid collecting box through a feces dispersing pipe, a feces collecting pipe and a urine collecting pipe.

The invention of non-water flushing device of lavatory, uses a four-way valve to replace the feces dispersing pipe magnetic valve, the magnetic valve of feces collecting and urine collecting pipe to control the feces liquid and urine in the feces dispersing pipe, feces and urine collecting pipe. The structure is simplified and the cost is decreased. Except this, as the four-way connector is cancelled the problem of the wrong flowing of the leaving liquid. Thus this can avoid the feces plasm flows into the flushing liquid collecting box or avoid the discharging of the limited and clean urine along the feces collecting pipe and the flushing effect is improved.

With the detailed description of the embodiments of the invention referring to the figures we can see the characters and advantages of the invention obviously.

In order to understand the invention better, we site the PCT application having the same applicant as this invention with the publication number of WO2/68764 to be the reference.

Figure 6:
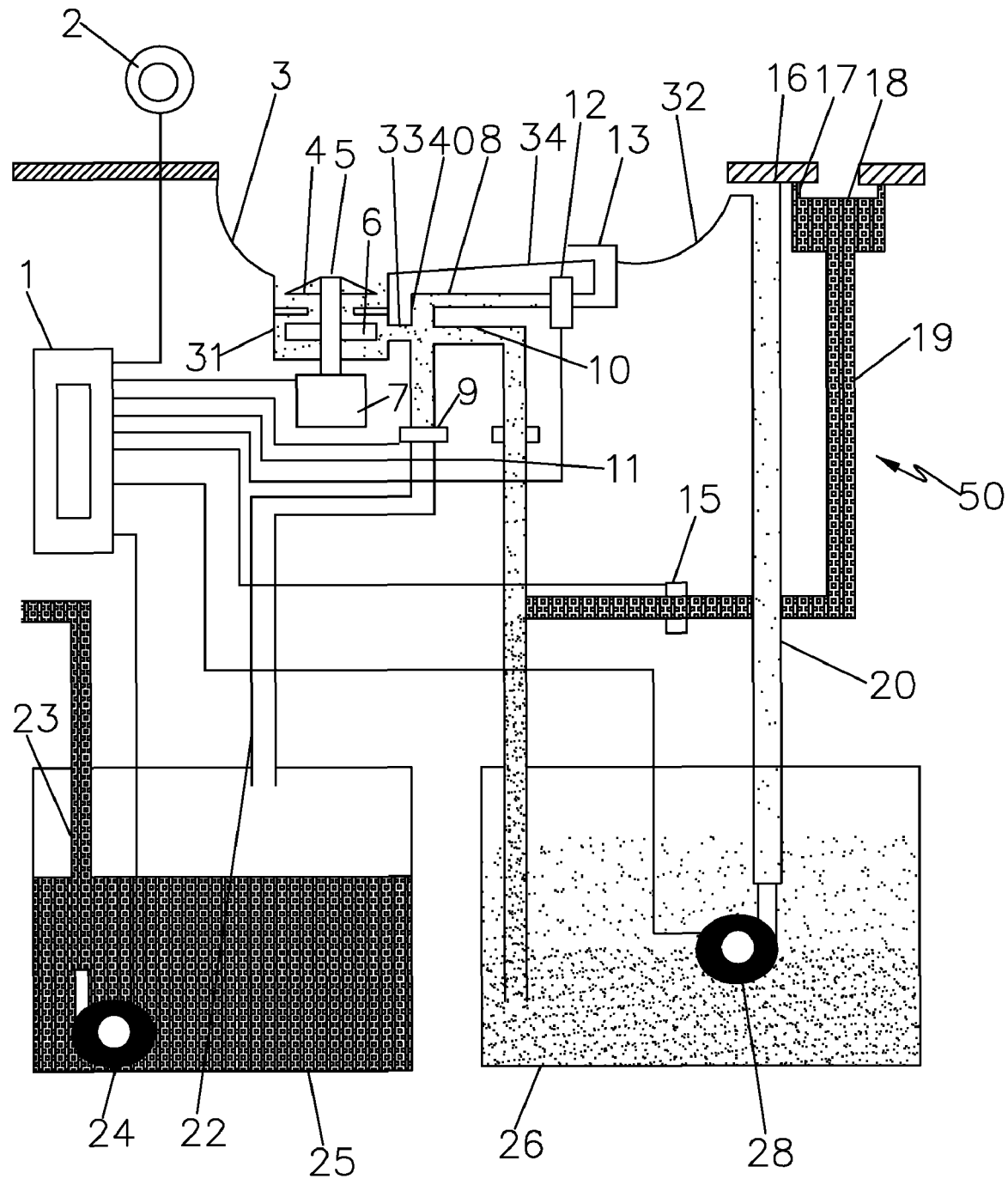
FIG. 6 is the longitudinal cross-sectional view of the non-water flushing lavatory in the prior art.

WO2/68764 published a kind of flushing lavatory, as shown in FIG. 6. It includes a human detection device 2, the circuit control device 1, a toilet pan 3, a dispersing and centrifugal device 5, a upper flushing liquid flushing pump 28, a flushing liquid collecting box 26, a feces collecting box 25, an automatic deodorant liquid adding device 50 and multiple pipeline device.

The dispersing and centrifugal device 5 consists of a dispersing tool pan 4 and a centrifugal blade 6 wheel mounted on the same rotating shaft and a motor 7, which is mounted at the valley 31 of the toilet pan, used for driving the rotating shaft. The upper flushing fluid flushing pump 28 is mounted at the internal or external of the flushing liquid box 26 and this makes the upper flushing liquid easy to be pumped out. The exit of the upper flushing fluid flushing pump is connected with shedding 16 at the front side 32 of the toilet pan 3 through a pipeline 20. The multiple pipeline device consists of a feces dispersing pipe 8 and a magnetic valve 12 mounted on it, a feces collecting pipe 22 and a magnetic valve of the feces collecting 9 mounted on it and a urine collecting pipe 10 and a magnetic valve 11 of the urine collecting pipe mounted on it. The entry of feces dispersing pipe 8, feces collecting pipe 22 and urine collecting pipe 10 is connected with the exit 33 of the side wall of the back valley 31 at the toilet pan for collecting the feces through a four-way connector 40, and the exit is connected with the shedding 13 of the middle part 34 of the toilet pan, the feces collecting box 25 and flushing liquid collecting box 26 respectively. The automatic deodorant liquid adding device 50 includes a medicine pot 17, medicine guiding 19, for which one end is connected with the bottom of the medicine pot 17 and the other end is connected with the urine collecting pipe 10 and a medicine adding magnetic valve 15 mounted on the medicine guiding pipe 9. A feces discharging pump 24, its entry is set at the bottom of the feces collecting box 25 and its exit is connected with a feces discharging pipe 23 extending out from the feces collecting box 25 and the exit of pipe 23 is connected with a accumulating container. The circuit control device 1 is electrically connected with the motor 7, upper flushing liquid flushing pump 28 and the motor of feces discharging pump 24, magnetic valve of the feces dispersing pipe 12, magnetic valve of the feces collecting pipe 9, magnetic valve of the urine collecting pipe 11, medicine adding magnetic valve 15 and human detection device 2. The circuit control device 1 is a common chip microcomputer. The human detection device 2 is set at the suitable position in the lavatory and is used for changing the detected signal of having people or not in the lavatory into the electric signal and then transfers it to the circuit control device 1. The detection device 2 could be the photoelectrical detecting device mounted in the lavatory and also could be the passive human infrared detector or the pressure sensor mounted under the floor of the lavatory and also could be the position switch set at the lock or cross-pin of the lavatory or other different kinds of detection devices only as its state could show if there is a person in the lavatory. For example, as the user enters the lavatory, the human body will barrier or reflect the light coming out from the photoelectrical detection device and it makes the state of the detection device changed. The infrared ray from the human body can change the state of passive human infrared detector. When a person steps on the floor, it can change the state of the pressure sensor under the floor. When a person locks the door, it can change the open or close state of the position switch. All the above working state of the detecting device could illustrate if someone is using the non-water flushing device in the lavatory.

Figure 7:
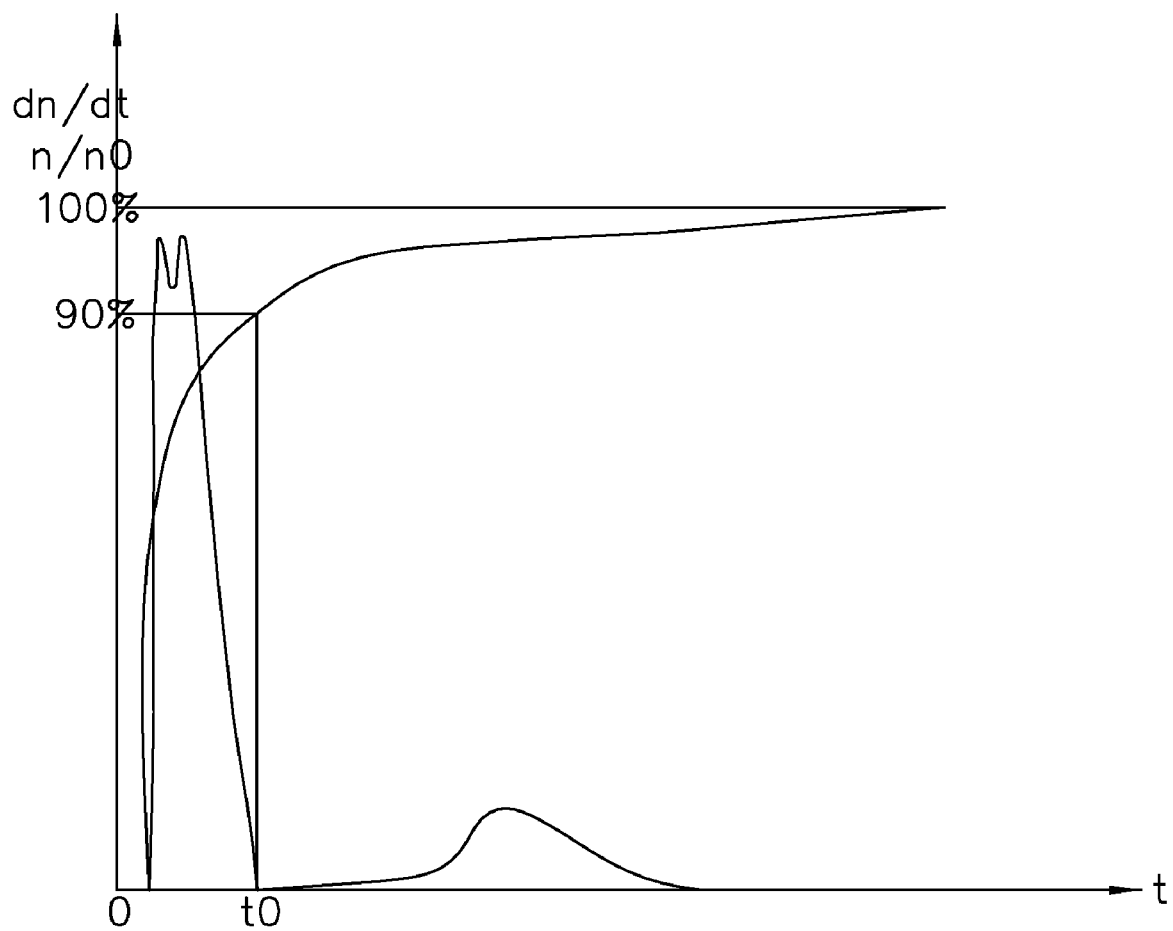
FIG. 7 is the statistical chart of time of defecating or peeing used by the way of defecating or peeing automatic identification in the circuit control device of the non-water flushing lavatory in the prior art.

As shown in FIG. 7, the statistical chart of time of peeing and defecating used by the way of peeing and defecating automatic identification in the circuit control device of the non-water flushing lavatory in the prior art. The chart shows the time of a person using the lavatory, peeing and defecating by plane rectangular coordinates. The chart is drawn by sampling the lavatory using time of several hundreds of people and it can show the using regulation of a common lavatory. The longitudinal coordinate is the differential of the number of people using the lavatory and the using time and it is shown in percentage. The horizontal coordinate is time for using the lavatory. There are two curves in the chart and the actual line shows the regulation of using time and number of people and the imaginal line shows the percentage of people finish using the lavatory between the total number of people before a certain time.

Form FIG. 7 we can see the three peak values are men peeing, women peeing and defecating. The imaginal line shows that 90% of people using the lavatory happens in the time of $0$-$t_0$ and almost all for peeing.

From the effective test we can see the tester could not finish defecating in less time than $t_0$, then we can get the conclusion: such a time t0 is existing and in such time no people could finish defecating. According to the actual test the value of t0 is between 1 minute and 1 and a half minute.

The above conclusion help us to find a automatic method for identifying the defecating or peeing by the time for using the lavatory. The program for identifying the defecating or peeing is set in the circuit control device 1 and is connected with the detection device 2.

Figure 8:
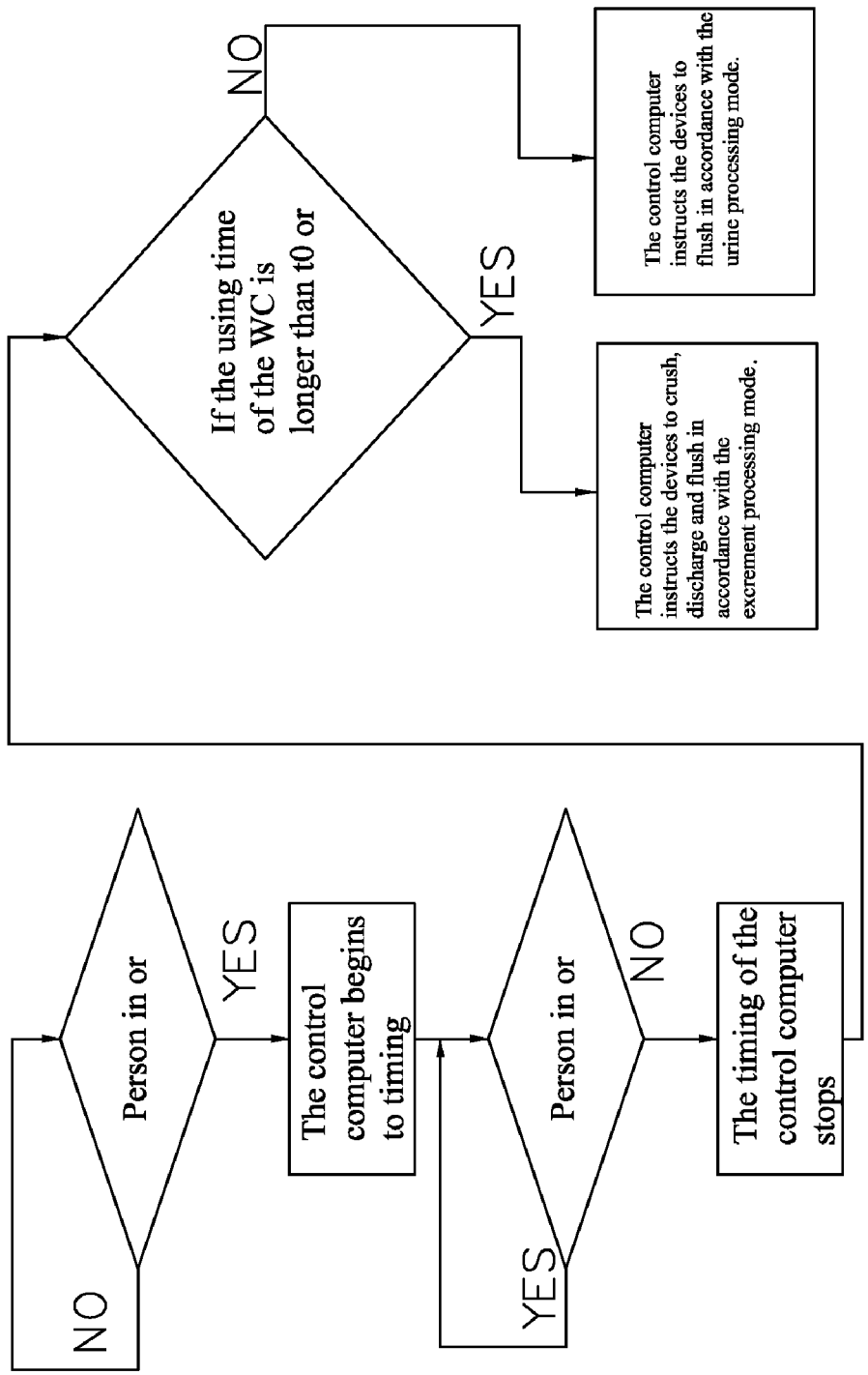
FIG. 8 is the logic chart of the defecating or peeing automatic identification of the non-water flushing lavatory in the prior art.

Referring to FIG. 8 which shows the logic chart of the defecating or peeing automatic identification of the non-water flushing lavatory in the prior art. The circuit control device 1 having the program of identifying the defecating or peeing, not only can start the procedure of flushing the toilet pan 3 according to the people's leaving signal provided by the detection device 2, but also can start timing according to the signal of user entering the lavatory provided by the detection device 2. The said timing process ends until the detection device 2 provides the signal of user leaving. The circuit control device 1 identifies the defecating or peeing according to the long and short time recorded by the timing device. That means when the time using the lavatory is shorter than t0, it can be determined that the user doesn't defecates. But as some user takes long time when pees so this way could not identify the defecating or peeing so correctly, but it can identify the number of users not defecating. The above method could not be called as "way of automatic identification of peeing" because user leaving the lavatory in t0 may not only pee, but also may do nothing.

Referring to FIG. 6, as the non-water flushing lavatory works and the defecating or peeing begins, the circuit control device 1 starts timing according to the defecating or peeing beginning signal sent by the detection device 2. When defecating or peeing, the circuit control device 1 makes the urine collecting magnetic valve 11 open and the urine will flow into the flushing liquid collecting box 26 through the dispersing and centrifugal device 5, urine collecting pipe 10. The separation of urine and feces is realized. In the process of urine collecting, the circuit control device 1 makes the medicine adding magnetic valve open and this lets the medicine liquid 18 from the medicine pot 17 flow into urine collecting pipe 10 through medicine liquid guiding pipe 19 and mix with the collected urine and then flow into the flushing liquid collecting box 26 and the change from the medicine liquid to flushing liquid is realized. When the user leaves the lavatory, the circuit control device 1 judges it was peeing by the identification program according to the defecating or peeing ending signal sent by the detection device 2, it will start the motor 7 of the upper flushing liquid flushing pump 28 and the motor of dispersing and centrifugal device 5 and upper flushing liquid in the flushing liquid collecting box 26 will be pumped by the upper flushing liquid flushing pump 28 and it flow into the shedding 16 at the front part 32 of the toilet pan 3 and flush it. Then it is sucked into the back valley 31 of the toilet pan 3 for collecting feces by the blade wheel 6 of the dispersing and centrifugal device 5 with the urine together. And then it will be pumped out into the urine collecting pipe 10 through the exit 33 at the side wall of the back valley 31 and flow back nit the flushing liquid collecting box 26. If it was defecating, the circuit control device 1 will close the urine collecting pipe magnetic valve 11 and start the upper flushing liquid flushing pump 28 and delay a certain time. The flushing liquid in the flushing liquid collecting box 26 will be pumped out by the upper flushing liquid flushing pump 28 and flow into the shedding 16 at the front part 32 of the toilet pan 3 along the flushing liquid pipe 20 and into the toilet pan 3. After those the circuit control device 1 starts the motor 7 of the dispersing and centrifugal device 5 and makes the feces dispersing pipe magnetic valve 12 open and the feces will be dispersed by the tool pan 4 of the dispersing and centrifugal device 5 and it will mix with the flushing liquid and become the gruel liquid. With the action of the blade wheel 6 of the dispersing and centrifugal device 5, a forced circulation on the annular path composed by the toilet pan 3, the back valley 31 of the toilet pan 3 for collecting feces and the feces dispersing pipe 8. After that, the circuit control device 1 closes the feces dispersing pipe magnetic valve 12 and opens the feces collecting pipe magnetic valve 9 and this makes the gruel feces liquid flow into the feces collecting box 25 through the feces collecting pipe 22. So there is a little gruel feces leaving in the bottom of the toilet pan 3. At this time only starting the upper flushing liquid flushing pump 28, the flushing liquid will flow into the toilet pan 3 with the action of the upper flushing liquid flushing pump 28 and the toilet pan 3 could be flushed clean easily. Use this kind of non-water flushing lavatory, the flushing liquid used for flushing the feces each time could decrease from the original 6-12 liter to about 0.5 liter and good flushing effect could be ensured.

From the above description we could know that as the prior art of non-water flushing lavatory works, its urine collecting pipe magnetic valve 11 feces dispersing pipe magnetic valve 12 and feces collecting pipe magnetic valve 9 have the same entry that is the exit 33 at the side wall of the back valley 31 of the toilet pan for collecting feces and different exits and its time for opening and closing are different.

DETAILED DESCRIPTION OF THE PREFERRED EMBODIMENT

Below is the detailed description of the invention, non-water flushing device in lavatory with flushing pump.

Figure 1:
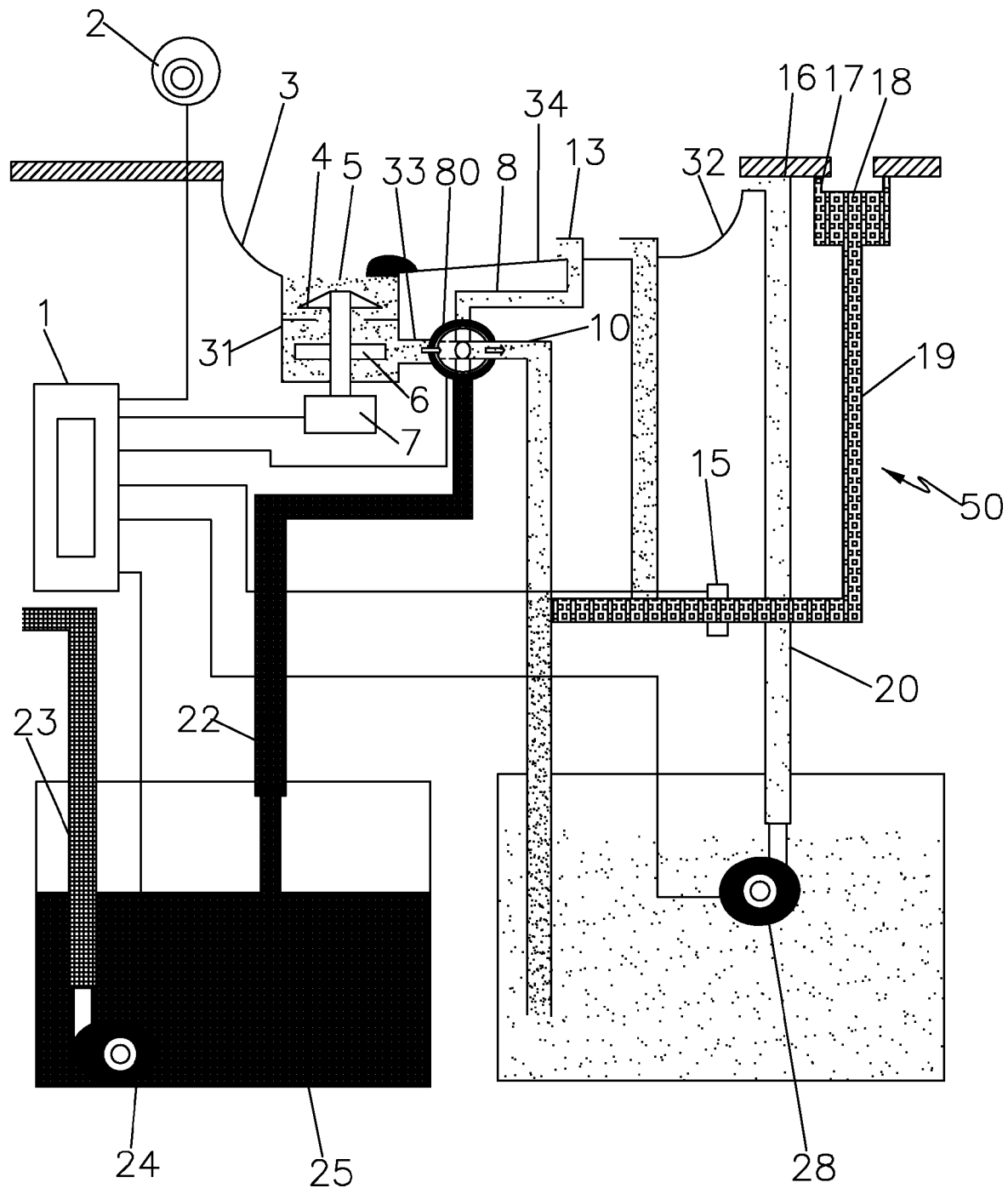
FIG. 1 is the longitudinal cross-sectional view of the first embodiment of the non-water flushing device of lavatory.

The first embodiment of non-water flushing device in lavatory with flushing pump as shown in FIG. 1. The main differences between FIG. 1 and FIG. 6 lines in that the of non-water flushing device in lavatory having an upper flushing liquid flushing pump 28, as shown in FIG. 1 has a four-way electrical control valve 80, which replaces the urine collecting pipe magnetic valve 11, feces dispersing pipe magnetic valve 12 and feces collecting pipe magnetic valve 9 of the non-water flushing device in lavatory having flushing pump, as shown in FIG. 6 and at the same time the four-way shedding 40, as shown in FIG. 6 has been canceled. Except this, the structure of non-water flushing device in lavatory as shown in FIG. 1 and FIG. 6 is almost same, so no detailed description will be given.

The shell of the four-way electrical control valve 80 has a cross fluid entry and three flow exits at the longitudinal direction. The above entry is connected with exit 33 at the side wall of the back valley 31 of the toilet pan 3 and the three exits are connected with the shedding 13 at the middle part 34 of the toilet, a feces collecting box 25 and a flushing liquid collecting box 26 through a feces dispersing pipe 8, a feces collecting pipe 22 and a urine collecting pipe 10. There is a L fluid pathway in the spool of the electrical control valve 80. The cross pathway of L pathway always goes in with the cross fluid entry of the four-way electrical control valve 80. The four-way electrical control valve 80 could be a four-way electric ball valve and it is the prior art.

When the non-water flushing lavatory with a flushing pump as shown in FIG. 1 works, the electrical control device 1 can make exit 33 at the side wall of the back valley 31 of the toilet pan 3 connect with the urine collecting pipe 10, feces dispersing pipe 8 and feces collecting pipe 22 respectively in different time by four-way electrical control valve 80. So the proper work of the non-water flushing lavatory with a flushing pump as shown in FIG. 1 could be realized. Referring to the above detailed description of the work process of the non-water flushing lavatory with a flushing pump as shown in FIG. 1, the ordinary technician in this filed could understand how the non-water flushing lavatory with a flushing pump as shown in FIG. 1 works and no other description is needed.

Figure 2:
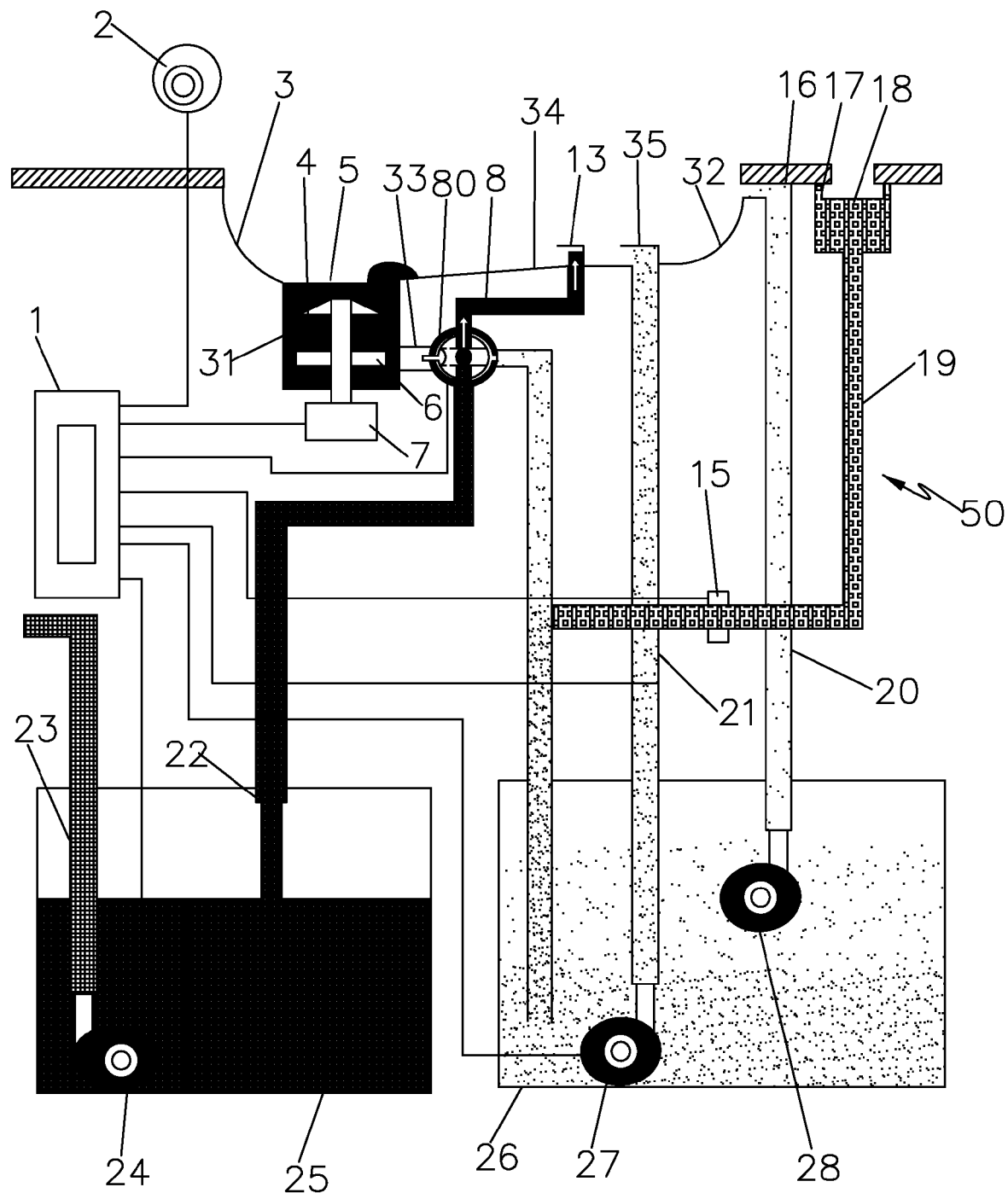
FIG. 2 is the longitudinal cross-sectional view of the second embodiment of the non-water flushing device of lavatory.

The second embodiment of non-water flushing device in lavatory with flushing pump as shown in FIG. 1. Compare with the non-water flushing lavatory with a flushing pump as shown in FIG. 1, the non-water flushing lavatory with a flushing pump as shown in FIG. 2 has a lower flushing liquid flushing pump 27 and a low flushing liquid pipeline 21 connected with the exit of the lower flushing liquid flushing pump 27. The lower flushing liquid flushing pump 27 is mounted in the flushing liquid collecting box 26 and is in the lower flushing liquid. The exit of pipeline 21 is connected with the flushing open end 35 at the middle part 34 of the toilet pan. The motor of lower flushing liquid flushing pump 27 is connected with the circuit control device 1 electrically.

When the above non-water flushing device in lavatory with flushing pump works, under the control of circuit control device 1, the lower flushing liquid flushing pump 27 extracts the sediment in the lower flushing liquid of the flushing liquid collecting box 26 and it goes up and reaches the flushing open end 35 in the lower flushing liquid through the lower flushing liquid pipeline 21. And then it blowouts toward the back of the toilet pan 3 with the leaving urine and feces to flush the toilet pan. After that the upper flushing liquid flushing pump 28 extracts the flushing liquid from the flushing liquid collecting box 26 and it goes up and reaches the open end 16 at the front part 32 of the toilet pan 3 through upper flushing liquid pipeline 20 and then the flushing liquid enters into the toilet pan 3 and also blowouts toward the back of the toilet pan 3 with the leaving urine and feces to flush the toilet pan again. So with the action of the lower flushing liquid flushing pump 27 and the upper flushing liquid flushing pump 28, the toilet pan 3 could be flushed clean without urine sediment left. And the sediment of the lower flushing liquid in the flushing liquid collecting box 26 could be consumed and it will not be accumulated more and more.

Figure 3:
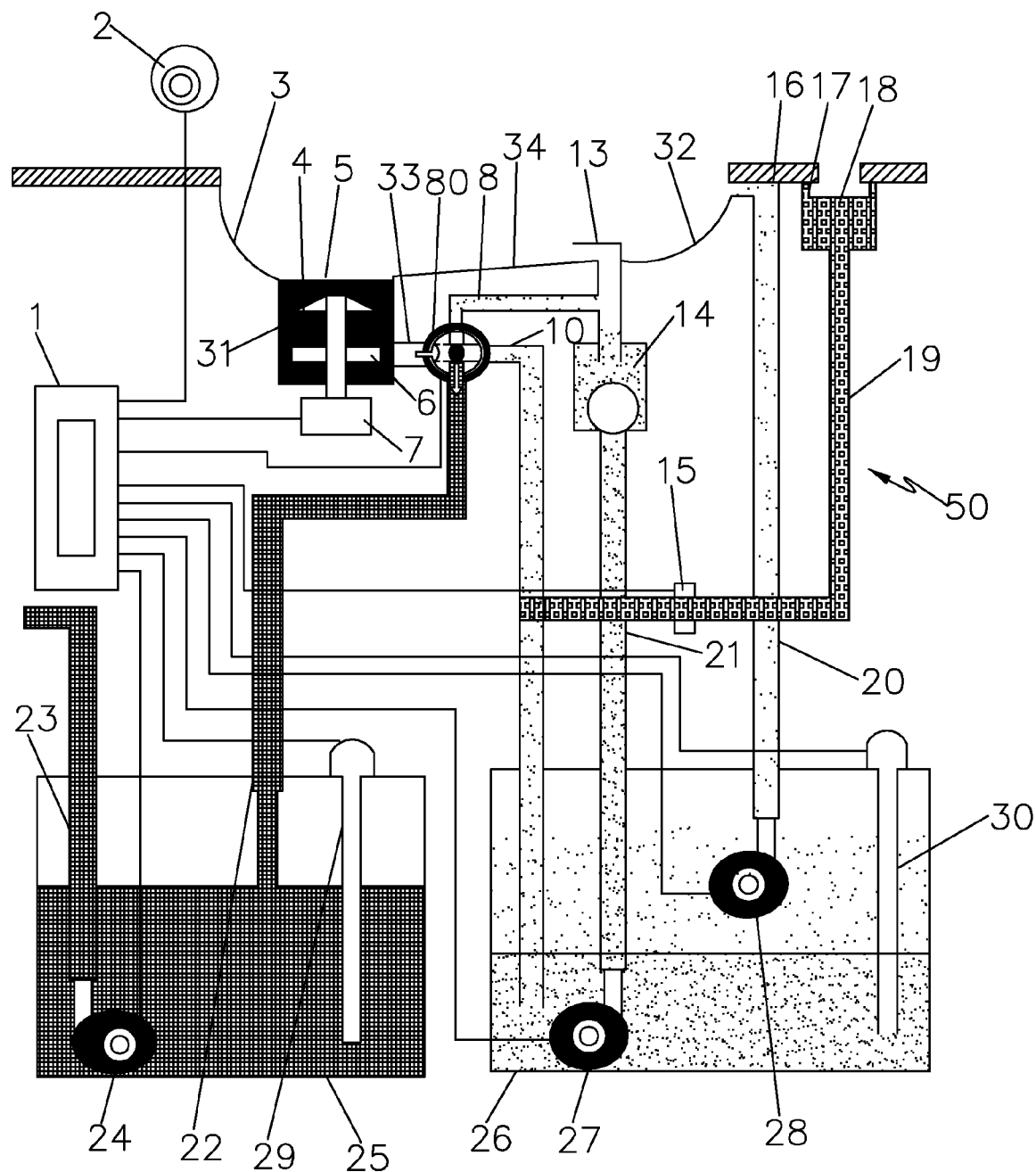
FIG. 3 is the longitudinal cross-sectional view of the third embodiment of the non-water flushing device of lavatory.

The third embodiment of non-water flushing device in lavatory with flushing pump as shown in FIG. 3. Compare with the non-water flushing lavatory with a flushing pump as shown in FIG. 2, the non-water flushing lavatory with a flushing pump as shown in FIG. 3 has a one-way valve. The exit of the lower flushing liquid flushing pump 27 is connected with the one-way valve 14 through the lower flushing liquid pipeline 21 and the exit of the one-way valve 14 is connected with the open end 13 at the middle part 34 of the toilet pan and the feces dispersing pipe 8. A liquid level sensor of the feces collecting box 29 and a liquid level sensor 30 of the urine collecting box are used in the above lavatory and the two sensors are connected with the circuit control device 1.

Figure 4:
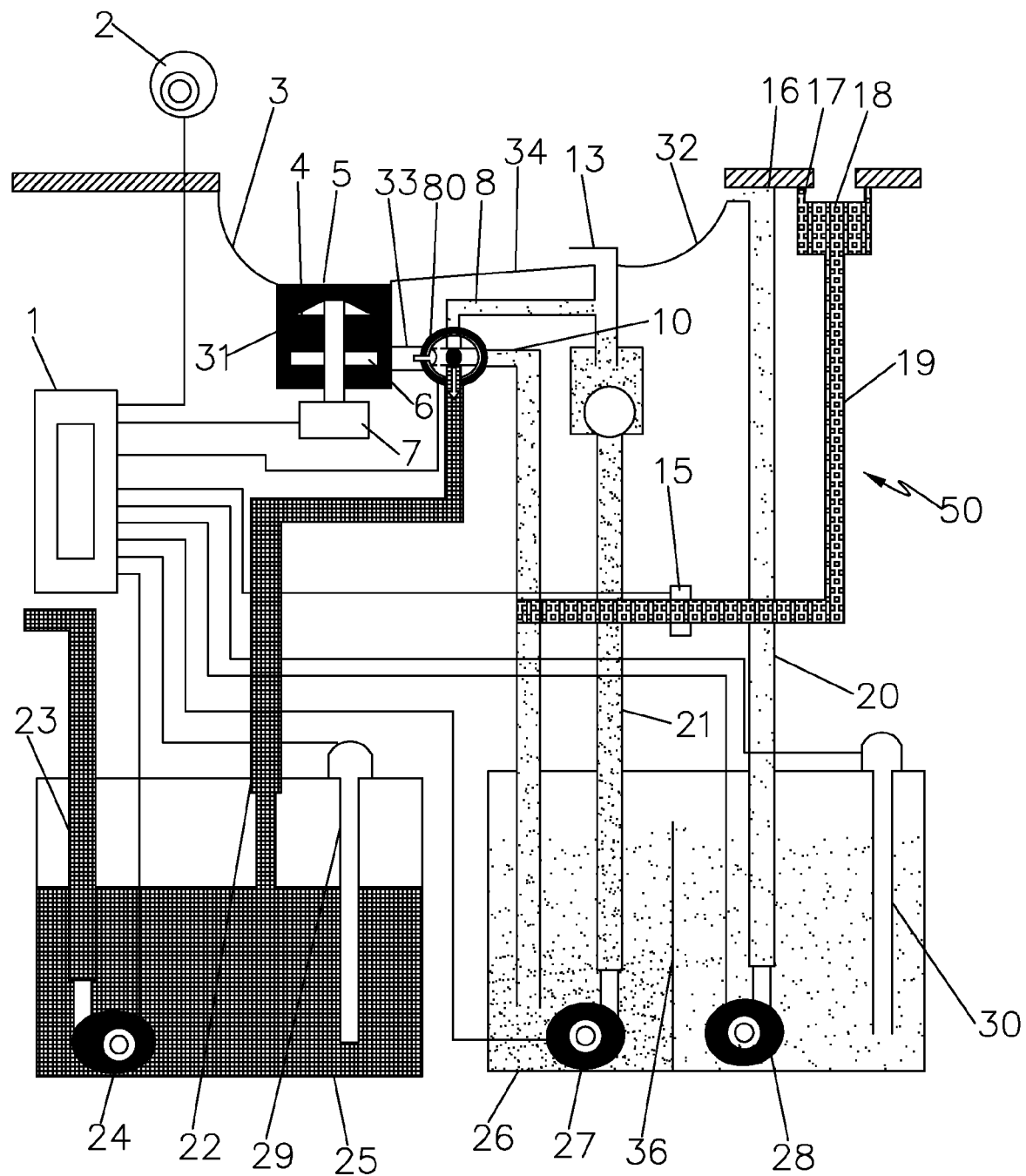
FIG. 4 is the longitudinal cross-sectional view of the fourth embodiment of the non-water flushing device of lavatory.

The fourth embodiment of non-water flushing device in lavatory with flushing pump as shown in FIG. 4. Comparing it with the non-water flushing device in lavatory with flushing pump as shown in FIG. 3, the difference is that a overflowing dummy plate 36 is set in the flushing liquid collecting box 26 and the lower flushing liquid flushing pump 27 and the upper flushing liquid flushing pump 28 in the flushing liquid collecting box 26 are mounted at the left and right side of the overflowing dummy plate 36 respectively. Near the bottom of the flushing liquid collecting box 26, the urine collecting pipe 10 is connected with the left side of the overflowing dummy plate 36. Setting the overflowing dummy plate 36 in the flushing liquid collecting box 26 could made the precipitated upper flushing liquid in the left side of overflowing dummy plate 36 overflow into the right side of plate 36 over it. The precipitated upper flushing liquid is most suitable to be the final flushing liquid when the non-water flushing device in lavatory with flushing pump of the invention works each time. Except this, as the precipitated upper flushing liquid in right side of overflowing dummy plate 36 will no longer to produce sediment, so it is unnecessary to mount the upper flushing liquid flushing pump 28 in the upper part of the flushing liquid. Then it can be avoided that the upper flushing liquid flushing pump 28 could not pump out the flushing liquid when liquid level of the precipitated upper flushing liquid reduced.

Figure 5:
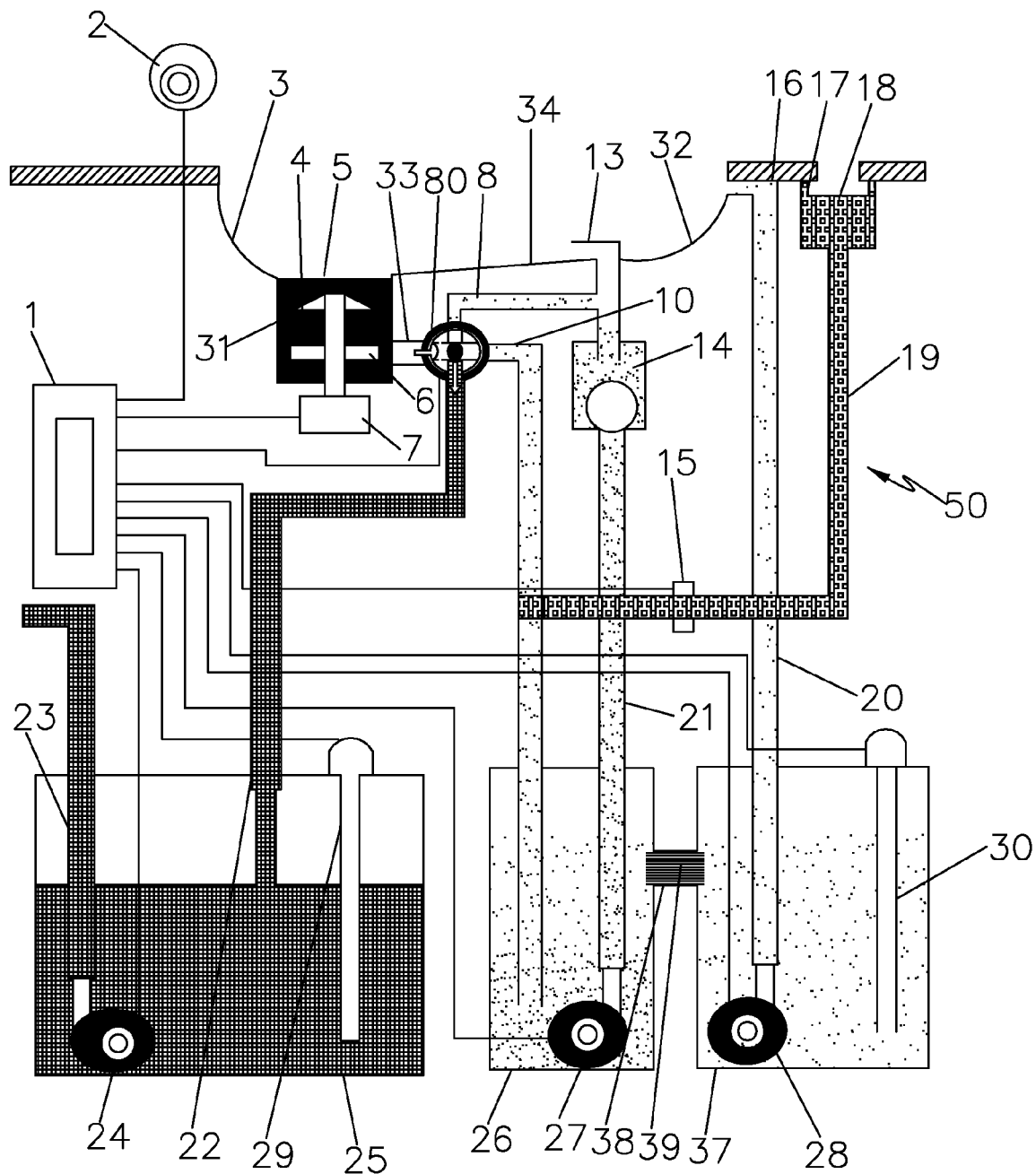
FIG. 5 is the longitudinal cross-sectional view of the fifth embodiment of the non-water flushing device of lavatory.

The fifth embodiment of non-water flushing device in lavatory with flushing pump as shown in FIG. 5. Comparing it with the non-water flushing device in lavatory with flushing pump as shown in FIG. 4, the difference is that the flushing liquid collecting box 26 is divided into left flushing liquid collecting and right flushing liquid collecting which are connected with each other through a middle pipe 38 at the upper part of it. Using the pathway generated by the middle pipe 38, a urine processing unit 39 could be set in and it can process the urine, such as filtration, decolourization, purification, disinfection, contaminant separation and so on. The lower flushing liquid flushing pump 27 and the upper flushing liquid flushing pump 28 are mounted in or out of the two left and right flushing liquid collecting boxes respectively. Near the bottom of the flushing liquid collecting box 26 the urine collecting pipe 10 is connected with the left flushing liquid collecting box and the liquid level sensor 30 of the flushing liquid collecting box is mounted in the right flushing liquid collecting box. Thus, the precipitated upper flushing liquid in the left flushing liquid collecting box can flow into the right flushing liquid collecting box through the middle pipe 38. The precipitated upper flushing liquid is most suitable to be the final flushing liquid when the non-water flushing device in lavatory with flushing pump of the invention works each time. Except this, as the precipitated upper flushing liquid flowing into the right flushing liquid collecting box will no longer to produce sediment, so it is unnecessary to mount the upper flushing liquid flushing pump 28 in the upper part of the flushing liquid. Then it can be avoided that the upper flushing liquid flushing pump 28 could not pump out the flushing liquid when liquid level of the precipitated upper flushing liquid reduced. Otherwise, for the fourth embodiment as shown in FIG. 4, as the precipitated upper flushing liquid in the left side of overflowing dummy plate 36 overflows into the right side of plate 36 through it, a large amount of flushing liquid foam will overflow into the right side of dummy plate 36 together. This will lead to the inaccuracy of the flushing liquid level transduced by the liquid level sensor 30 of the flushing liquid collecting box. But for the fifth embodiment as shown in FIG. 5, the possibility for producing this problem is more less. Furthermore, a urine processing unit 39 could be mounted in the middle pipe 38 and it can process the urine, such as filtration, decolourization, purification, disinfection, contaminant separation and so on. And then the non-water flushing device in lavatory with flushing pump of the invention could have the same good flushing effect as the water flushing lavatory.

As shown in FIG. 1 to FIG. 6, the feces discharging pump 24, the lower flushing liquid flushing pump 27 and the upper flushing liquid flushing pump 28 are mounted in the feces collecting box 25 and the flushing liquid collecting box 26. For the invention, the feces discharging pump 24, the lower flushing liquid flushing pump 27 and the upper flushing liquid flushing pump 28 also could be mounted outside of the feces collecting box 25 and the flushing liquid collecting box 26 and at this time the exits of the feces discharging pump 24, the lower flushing liquid flushing pump 27 and the upper flushing liquid flushing pump 28 should be connected with the correspondent outlets of the feces collecting box 25 and the flushing liquid collecting box 26 respectively.

The claims defining the invention are as follows:

1. A non-water lavatory flushing device consists of a human detection device, a circuit control device, a toilet pan, a dispersing and centrifugal device, a upper flushing fluid flushing pump, a flushing liquid collecting box, a feces collecting box, an automatic deodorant liquid adding device, the dispersing and centrifugal device consists of a dispersing tool pan and a centrifugal blade wheel and a motor, wherein both the dispersing tool pan and the centrifugal blade wheel are mounted on a rotating shaft, the motor is mounted at the valley of the toilet pan and used for driving the rotating shaft, the upper flushing fluid flushing pump is mounted at the internal or external of the flushing liquid box for making the upper flushing liquid easy to be pumped out, an exit of the upper flushing fluid flushing pump is connected with shedding at a front side of the toilet pan through a pipeline, wherein a four-way electrical control valve having a cross fluid entry and three flow exits at a longitudinal direction, the cross fluid entry is connected with an exit of the side wall of the valley at the back of the toilet pan for collecting the feces, and the three flow exits are connected with the shedding at the middle part of the toilet pan, feces collecting box and the flushing liquid collecting box through a feces dispersing pipe, a feces collecting pipe and a urine collecting pipe, wherein a lower flushing liquid flushing pump is included and is mounted in the flushing liquid collecting box so the lower flushing liquid is easy to be pumped out via a lower flushing liquid pipeline, wherein a one-way valve is included in the lower flushing liquid pipeline, the one-way valve having a one-way valve entry and one-way valve outlet, the one-way valve entry is connected with the outlet of the lower flushing liquid flushing pump, and the one-way valve outlet is connected with the shedding of the middle part of the toilet pan and the feces dispersing pipe, wherein the flushing liquid collecting box is separately divided into a left flushing liquid collecting box and a right flushing liquid collecting box, wherein the two flushing liquid collecting boxes are connected with each other through a middle pipe disposed at an upper part thereof, wherein the lower flushing liquid flushing pump is mounted in the left flushing liquid collecting box, and the upper flushing liquid flushing pump is mounted in the right flushing liquid collecting box, wherein the lower and upper flushing liquid in the left and right flushing liquid collecting boxes is easy to be pumped out by the lower and upper flushing liquid flushing pump, and wherein the urine collecting pipe is connected with the left flushing liquid collecting box, wherein a urine processing unit is mounted in the middle pipe so as to process the urine, including filtration, deodorization, purification, disinfection, and contaminant separation, wherein a liquid level sensor of feces collecting box and a liquid level sensor of flushing liquid collecting box are included, the liquid level sensor of feces collecting box is mounted in the feces collecting box and the liquid level sensor of flushing liquid collecting box is mounted in the flushing liquid collecting box.

* * * * *